US012766919B2

(12) United States Patent
Habte

(10) Patent No.: US 12,766,919 B2
(45) Date of Patent: Oct. 20, 2026

(54) VEHICLE AIR VENT WITH AUTOMATED VANE CONTROL

(71) Applicant: JoysonQuin Automotive Systems North America, LLC, Troy, MI (US)

(72) Inventor: Melaku Habte, Rochester Hills, MI (US)

(73) Assignee: Joysonquin Automotive Systems North America, LLC, Troy, MI (US)

( * ) Notice: Subject to any disclaimer, the term of this patent is extended or adjusted under 35 U.S.C. 154(b) by 641 days.

(21) Appl. No.: 18/302,095

(22) Filed: Apr. 18, 2023

(65) Prior Publication Data

US 2023/0347716 A1 Nov. 2, 2023

Related U.S. Application Data

(60) Provisional application No. 63/363,902, filed on Apr. 29, 2022.

(51) Int. Cl.
*B60H 1/00* (2006.01)
*B60H 1/34* (2006.01)

(52) U.S. Cl.
CPC ..... *B60H 1/00871* (2013.01); *B60H 1/00564* (2013.01)

(58) Field of Classification Search
CPC .... B60H 2001/3471; B60H 2001/3478; B60H 1/3421; B60H 1/3414; B60H 1/00871; B60H 1/00564
See application file for complete search history.

(56) References Cited

U.S. PATENT DOCUMENTS

| | | | |
|---|---|---|---|
| 11,007,844 | B1 | 5/2021 | Habte |
| 2004/0203334 | A1 | 10/2004 | Shibata et al. |
| 2015/0239325 | A1 | 8/2015 | Londiche et al. |
| 2019/0359034 | A1 | 11/2019 | Dinant et al. |
| 2021/0237539 | A1 | 8/2021 | Habte |
| 2022/0097489 | A1 | 3/2022 | Tang |

FOREIGN PATENT DOCUMENTS

| | | | | | |
|---|---|---|---|---|---|
| CN | 111016584 | A * | 4/2020 | ........... B60H 1/3414 |
| DE | 102017113906 | A1 | 8/2017 | |
| DE | 102017218621 | A1 | 4/2019 | |
| EP | 0596446 | A1 | 5/1994 | |
| FR | 2896187 | A1 | 7/2007 | |
| FR | 3081384 | B1 | 5/2020 | |
| JP | H0952519 | A * | 2/1997 | |

OTHER PUBLICATIONS

International Search Report and Written Opinion for PCT/US23/18898b dated Jul. 13, 2023, 50 pages.

* cited by examiner

*Primary Examiner* — Steven S Anderson, II
(74) *Attorney, Agent, or Firm* — Brutzel Long

(57) ABSTRACT

The present disclosure relates to a vehicle air vent comprising a body, an actuator, a first set of vanes, a first vane drive system moveably connected to the first set of vanes, a second set of vanes, and a second vane drive system moveably connected to the second set of vanes. The actuator is positioned to, in operation, provide force to both the first and second vane drive systems in a single direction, thus causing movement of both the first and second sets of vanes.

20 Claims, 14 Drawing Sheets

VEHICLE AIR VENT WITH AUTOMATED VANE CONTROL

CLAIM OF PRIORITY

This patent document claims priority to U.S. Provisional Patent Application No. 63/363,902, filed Apr. 29, 2022. The disclosure of this priority application is fully incorporated into this document by reference.

BACKGROUND

This disclosure relates to the field of vehicle air vents, and particularly air vents that are controlled using an actuator to move the vanes of the air vent.

A vehicle air vent is typically controlled by manual movement by a user. Automated vane control can provide the user with, for example, a streamlined car interior; easy to use electronic controls, precise positioning of the vent, and repeatable preset positions. In order to provide multi-directional airflow adjustments, multiple sets of vanes can be used, but conventional units require two motors, one to move each set of vanes. This can increase the cost of producing the air vent, as well as increase the form factor of entire air vent. The resulting increase in size can present a significant problem if the unit is to be dropped into an existing car with small manual vents.

This patent document describes an apparatus that addresses at least some of the issues described above and/or other issues.

SUMMARY

In a first aspect, this document discloses a vehicle air vent comprising a body, an actuator, a first set of vanes, a first vane drive system moveably connected to the first set of vanes, a second set of vanes, and a second vane drive system moveably connected to the second set of vanes. The actuator is positioned to, in operation, provide force to both the first and second vane drive systems in a single direction, thus causing movement of both the first and second sets of vanes.

In some embodiments, the first vane drive system comprises at least one gear configured to transfer a torque from the actuator to the first set of vanes.

In some embodiments, the second vane drive system is configured to drive the second set of vanes through a complete range of motion at least one time for about every one degree of movement of the first set of vanes. The second vane drive system can also be configured to drive the second set of vanes through a complete range of motion at least four times, at least eight times, at least twenty five times, or more for every one time that the first set of vanes is driven through a complete range of motion. In some embodiments, the first and second vane drive systems are configured such that the force in a single direction drives the first fins and the second fins through a full range of motion without requiring a force in a second direction.

DETAILED DESCRIPTION

Figure 1:
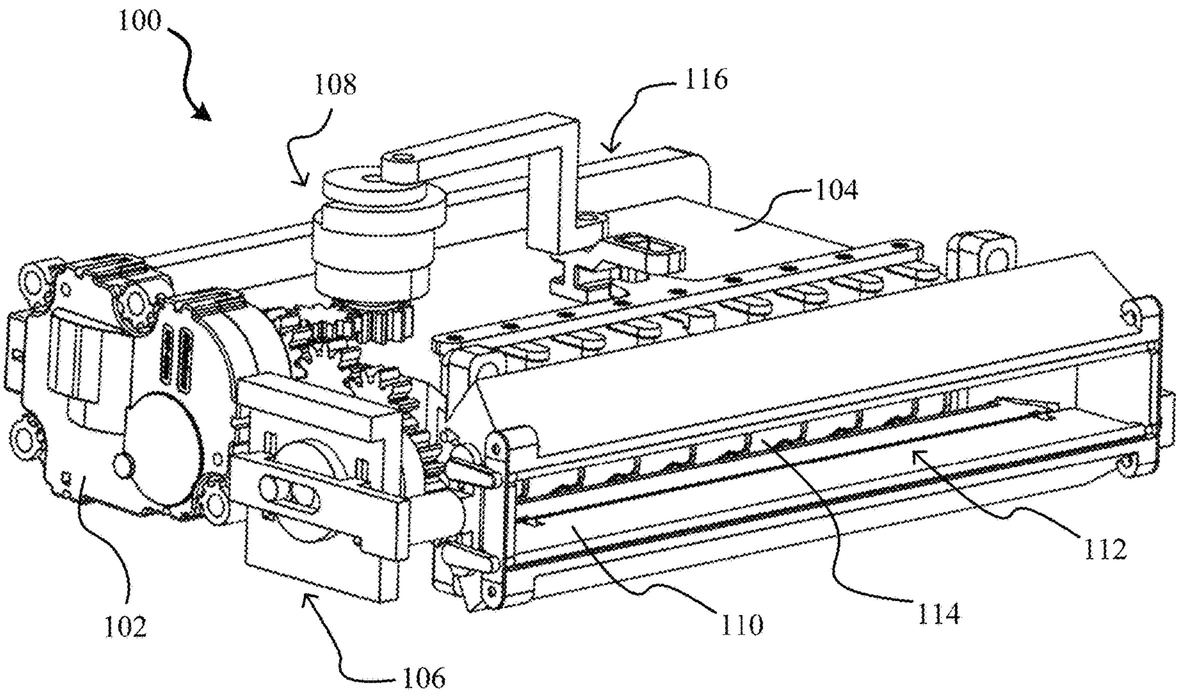
FIG. 1 is a front, right, top side perspective view of an example vehicle air vent.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/− 10 percent of the value.

In this document, the term "connected", when referring to two physical structures, means that the two physical structures touch each other. Devices that are connected may be secured to each other, or they may simply touch each other and not be secured.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

This disclosure is not limited to the particular systems, methodologies or protocols described, as these may vary. The terminology used in this description is for the purpose of describing the particular versions or embodiments only, and is not intended to limit the scope.

In various embodiments, a vehicle air vent can include an actuator to control positioning of vanes to direct the flow of air exiting the vent. The vent can include multiple sets of vanes to direct the air in multiple directions. For example, the vent can include a set of horizontal vanes to direct air up or down or a set of vertical vanes to direct are left or right. The sets of vanes may be offset from each other to prevent full movement of the vanes without interference from each. Conventional systems may require manual movement of both sets of vanes. Actuators can make this process automated, however, using multiple actuators in a vehicle air vent can add additional costs and bulkiness to the system. The disclosed single actuator system addresses these issues by using a single actuator to move both a horizontal and vertical vane set. The actuator can rotate in a single direction and drive both vane sets to adjust both vane sets to various angles, as determined by the user.

FIGS. 1-10 illustrate various views of an example vehicle air vent 100. The air vent 100 can include an actuator 102, a body 104, a primary vane (horizontal) drive system 106, and secondary (vertical) vane drive system 108, primary vanes 110, secondary vanes 114, a front air exit 112, and an air inlet 116. Air can travel from an air source (not pictured) into inlet 116 through body 104. While the air is passing through body 104, it can be directed through two or more sets of vanes that can change the direction of the air flow. For example, primary vanes 110 can influence the flow direction of the air in a vertical direction, while the secondary vanes 114 can influence the flow of the air in a horizontal direction. For example, the vertical direction can be a direction perpendicular to the floor of the vehicle. In other words, primary vanes 110 can direct air up or down relative to the floor of the vehicle. Conversely, the horizontal direction can be parallel to the floor of the vehicle. In other words, secondary vanes 114 can direct air left or right (parallel to the vehicle floor).

As another example, primary vanes 110 can be substantially parallel to a plane. The plane could be the floor or ceiling of the vehicle, the roof, a housing of the air vent, etc. A primary axis (i.e., along the length of the vanes) can remain parallel to the plane as the vanes move to change the direction of air flow. For example, when the plane is defined as the floor of the vehicle, primary vanes 110 are parallel to the floor of the vehicle and can direct air up (toward the vehicle roof) or down (toward the floor of the vehicle). Secondary vanes can be perpendicular to the plane. Thus, when the plane is defined as the floor of the vehicle, secondary vanes 114 are perpendicular to the floor of the vehicle and can direct air left or right, but the air will remain parallel to the plane (if it is not influenced by primary vanes 110). In other examples, primary vanes 110 could be at a different angle with respect to the plane (such as the floor of the vehicle). Secondary vanes 114 could be positioned substantially perpendicular to primary vanes 110.

Accordingly, primary vanes 110 can be positioned to direct air in a first direction. The secondary vanes 114 can be positioned to direct air in a second direction. As described above, the first direction and second direction can be different directions.

Actuator 102 can rotate a drive shaft (not pictured) connected to a gear 202 that is meshed with gears of both primary vane drive system 106 and secondary vane drive system 108. In this way, rotation of the single actuator 102 can cause motion of both primary vanes 110 and secondary vanes 114. Accordingly, a single actuator 102 can be placed at the side of air vent 100 and be used to drive both sets of vanes. This provides an improvement in size, complexity (e.g., number of parts), and efficiency (e.g., electrical power consumption) over a system using multiple actuators (e.g., one actuator to drive the primary vanes and one actuator to drive the secondary vanes). Actuator 102 can be an electric motor or other type of suitable motion device.

Secondary vane drive system 108 can include a gear 210 to receive a torque input from actuator 102 via gear 202. While depicted as separate visible gears, secondary vane drive system 108 (and primary vane drive system 106 described in greater detail below) could take various forms including dedicated enclosed or sealed gearboxes or transmissions. Gears 202 and 210 can include meshing bevel gears to change the plane of rotation of the actuator 102 (e.g., from the shaft of actuator 102 to a perpendicular shaft along the axis of rotation of spindle 216. In some embodiments, other types of gears to transmit torque between shafts at right angles may be used, for example, a worm gear or hypoid gear. As illustrated in FIG. 2B, the bevel (or other type) gears 202B, 210B of gears 202, 210 can also be fixed to a spur gear 202A, 210A (or similar gear such as a helical gear) to transfer torque along another direction. The gears may be integrally formed or otherwise connected together using a weld, adhesive, one or more fasteners, or other suitable method of attachment. Spur gear 210A can mesh with spur gear 217 of spindle 216. Accordingly, when the drive shaft of actuator 102 rotates, gear 202 will rotate. The rotation of gear 202 can be transferred to gear 210 through bevel gears 202B and 210B. The rotation will be further transferred to gear 217 by spur gear 210A.

Figure 2A:
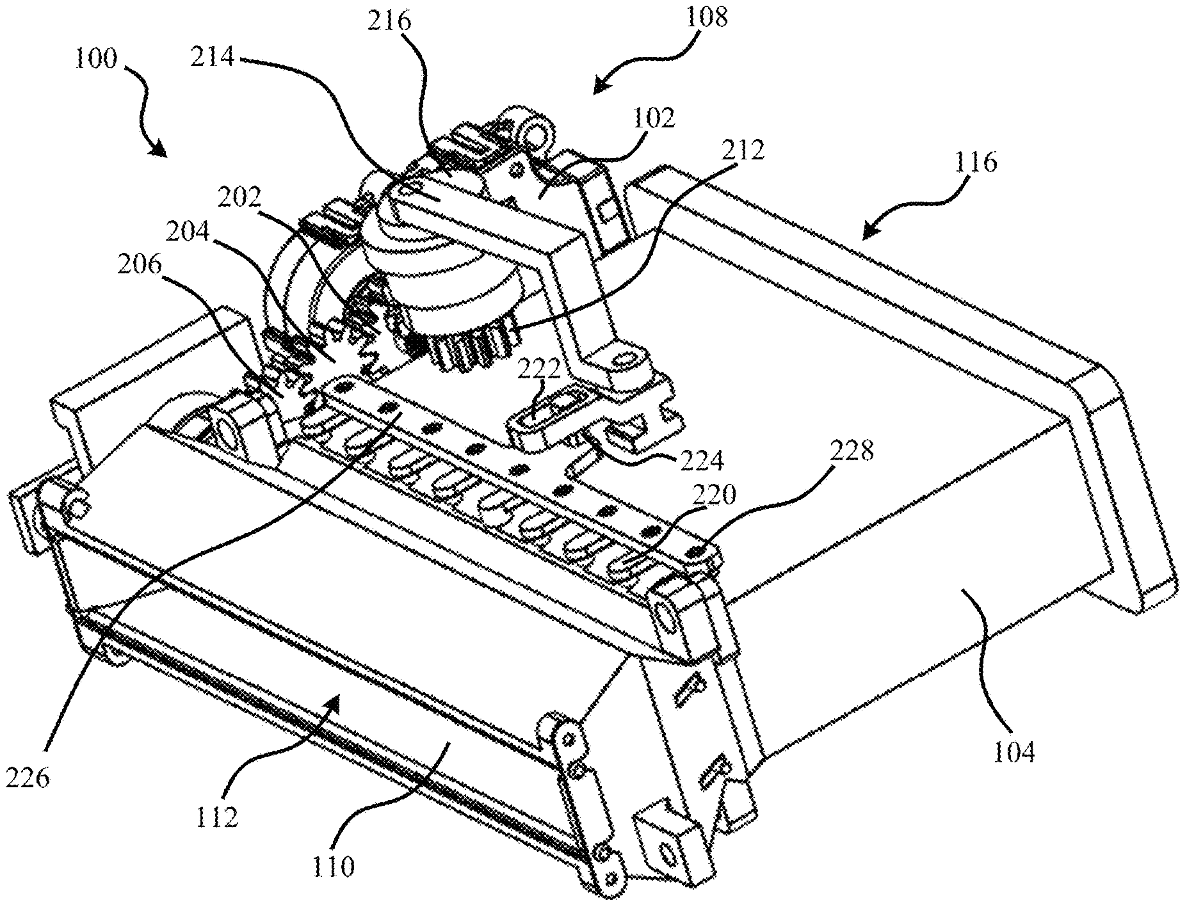
FIG. 2A is a front, left, top side perspective view of the example vehicle air vent of FIG. 1.
Figure 2B:
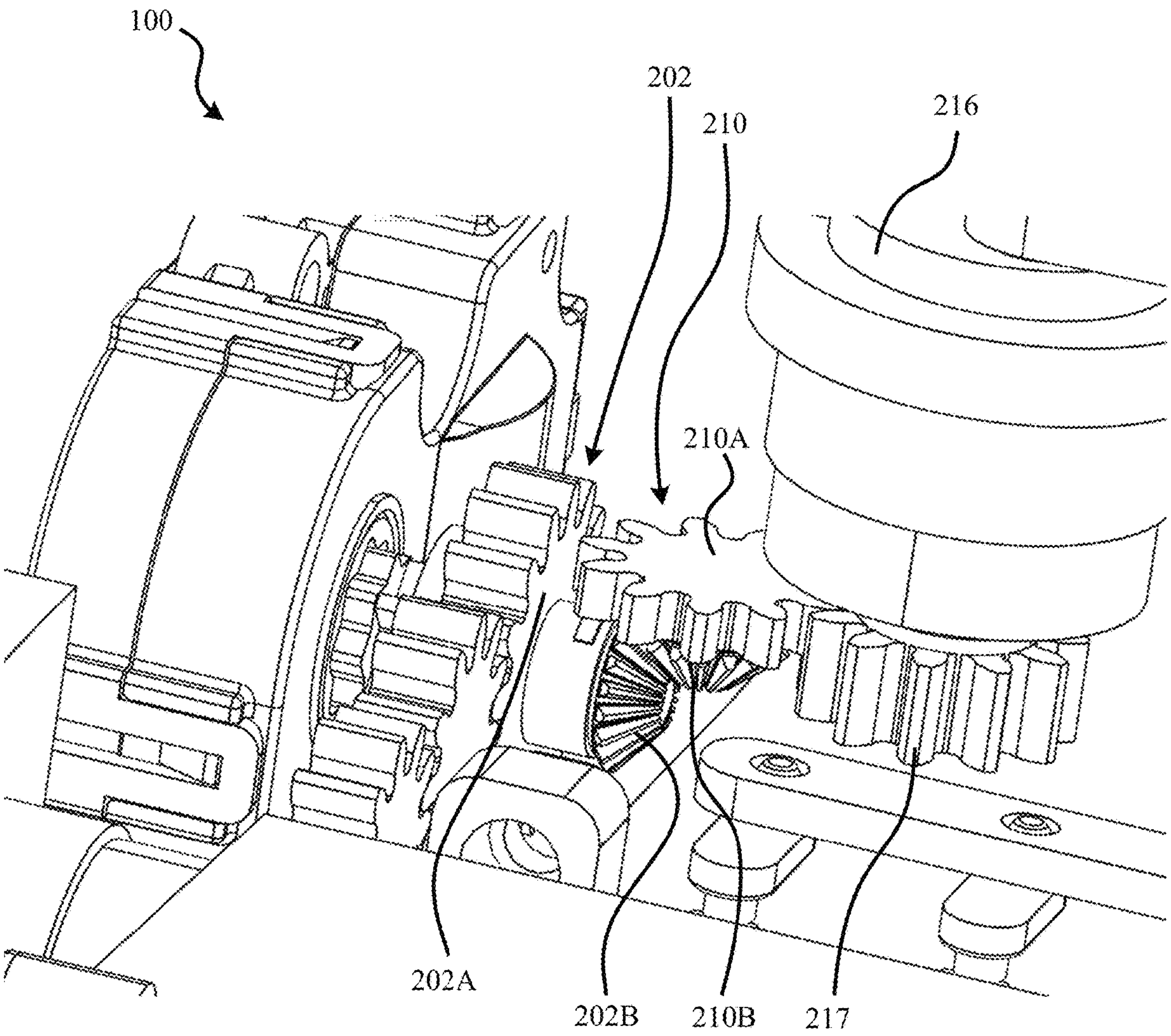
FIG. 2B is a perspective view of gears of the example vehicle air vent of FIG. 1.
Figure 3:
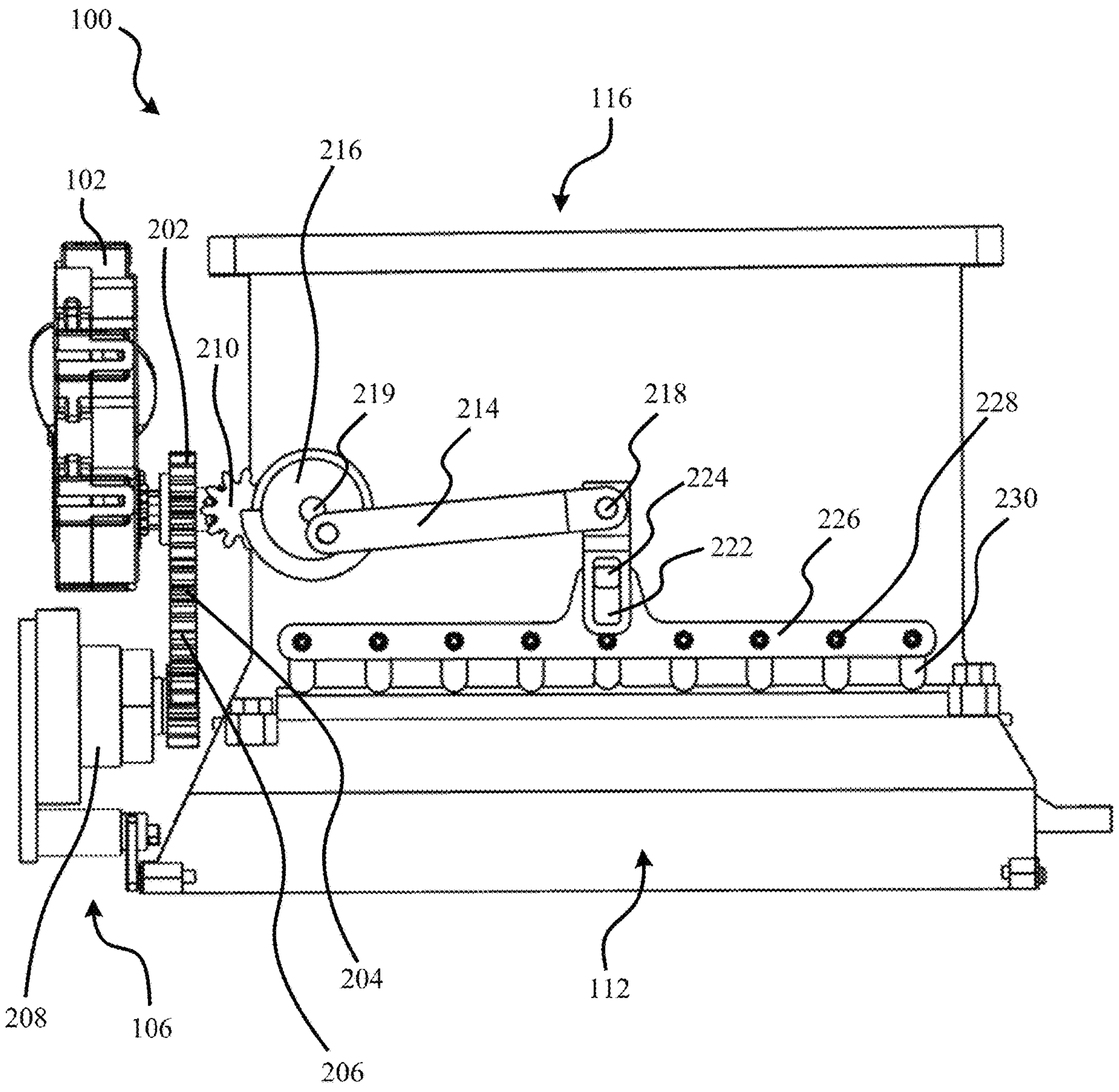
FIG. 3 is a top view of the example vehicle air vent of FIG. 1.

Referring to FIGS. 2A and 3, spindle 216 can rotate about pivot 219. Pivot 219 can include a shaft, pin, or other suitable structure about which spindle 216 can rotate. In addition, spindle 216 can be attached to shaft 214. Shaft 214 can be eccentrically attached to spindle 216 such that the rotation of spindle 216 causes the end of the shaft 214 to rotate about pin 219. Such rotation causes pin 218 to translate both forward/backward and left/right. The forward/backward translation is taken up by slot 222, in which protrusion 223 slides along. Alternatively, vane guide bar 226 could include the slot and the bar 220 could include the protrusion 223. The left/right translation of pivot 218 will cause left to right movement of vane guide bar 226. The individual secondary vanes 114 are attached to vane guide bar 226 by links 230. The attachment point of the secondary vanes 114 to links 230 can be at the top of the vanes, exterior to body 104 of the air vent 100 to limit impedance (by the links 230 and vane guide bar 226) of the flow of air through body 104. Links 230 and secondary vanes 114 pivot near the front side of the links. Accordingly, when vane guide bar 226 translates laterally (i.e., left and right in FIG. 3), the secondary vanes 114 will pivot, changing the left/right direction of the airflow through body 104 (coming through inlet 116). As an example from the perspective of FIG. 3, as vane guide bar 226 translates to the right, the rear sides of links 230 will move to the right, causing secondary vanes 114 to rotate clockwise and direct air to the left. Conversely, as vane guide bar 226 translates to the left, the rear sides of links 230 will move to the left, causing secondary vanes 114 to rotate counterclockwise and direct air to the right.

Figure 4:
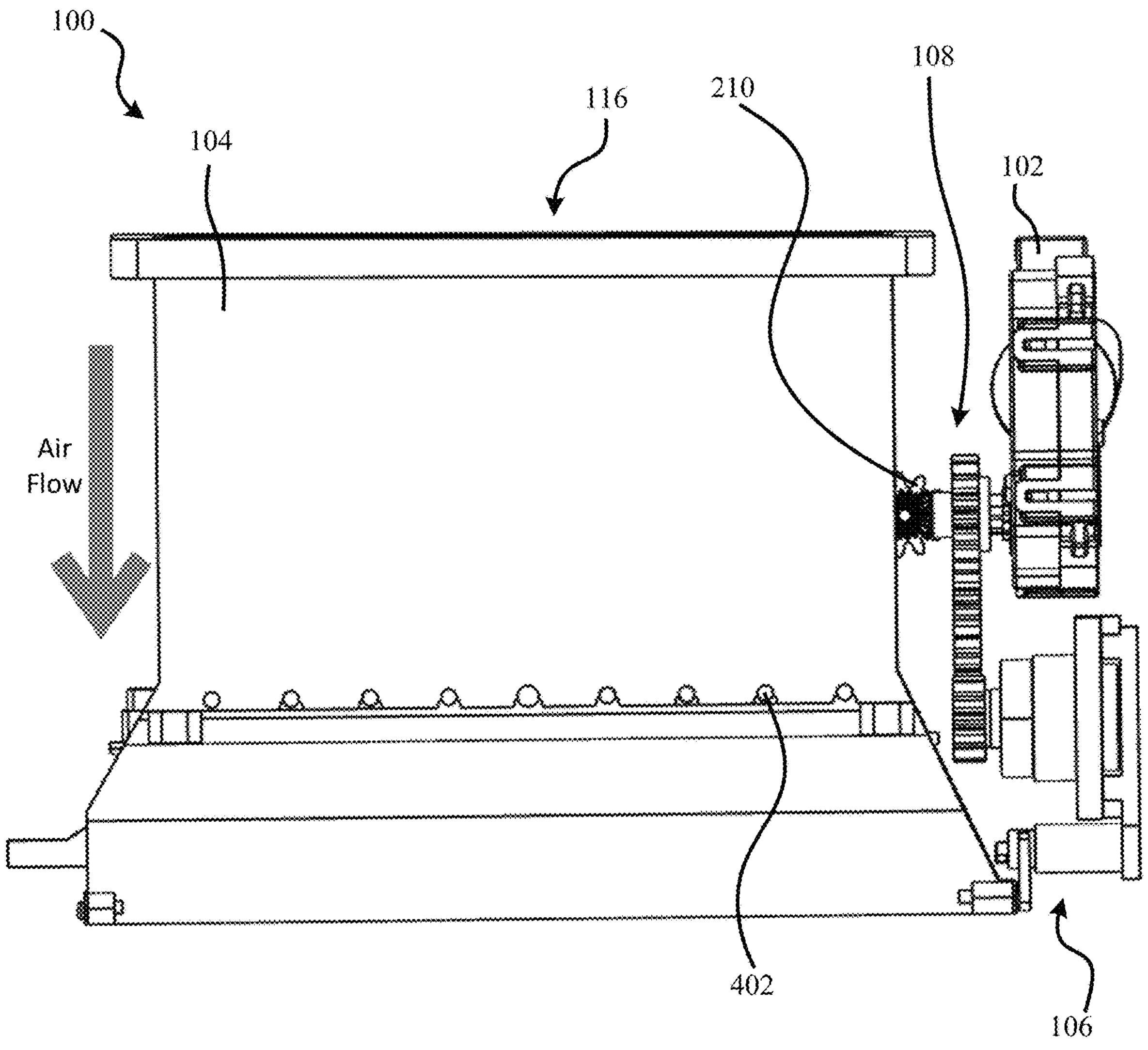
FIG. 4 is a bottom view of the example vehicle air vent of FIG. 1.

FIG. 4 illustrates this airflow direction. Also illustrated by FIG. 4 are pivots 402, which can be connected to the bottom of secondary vanes 114 to provide additional support for the secondary vanes 114 while also permitting their rotation.

Figure 5:
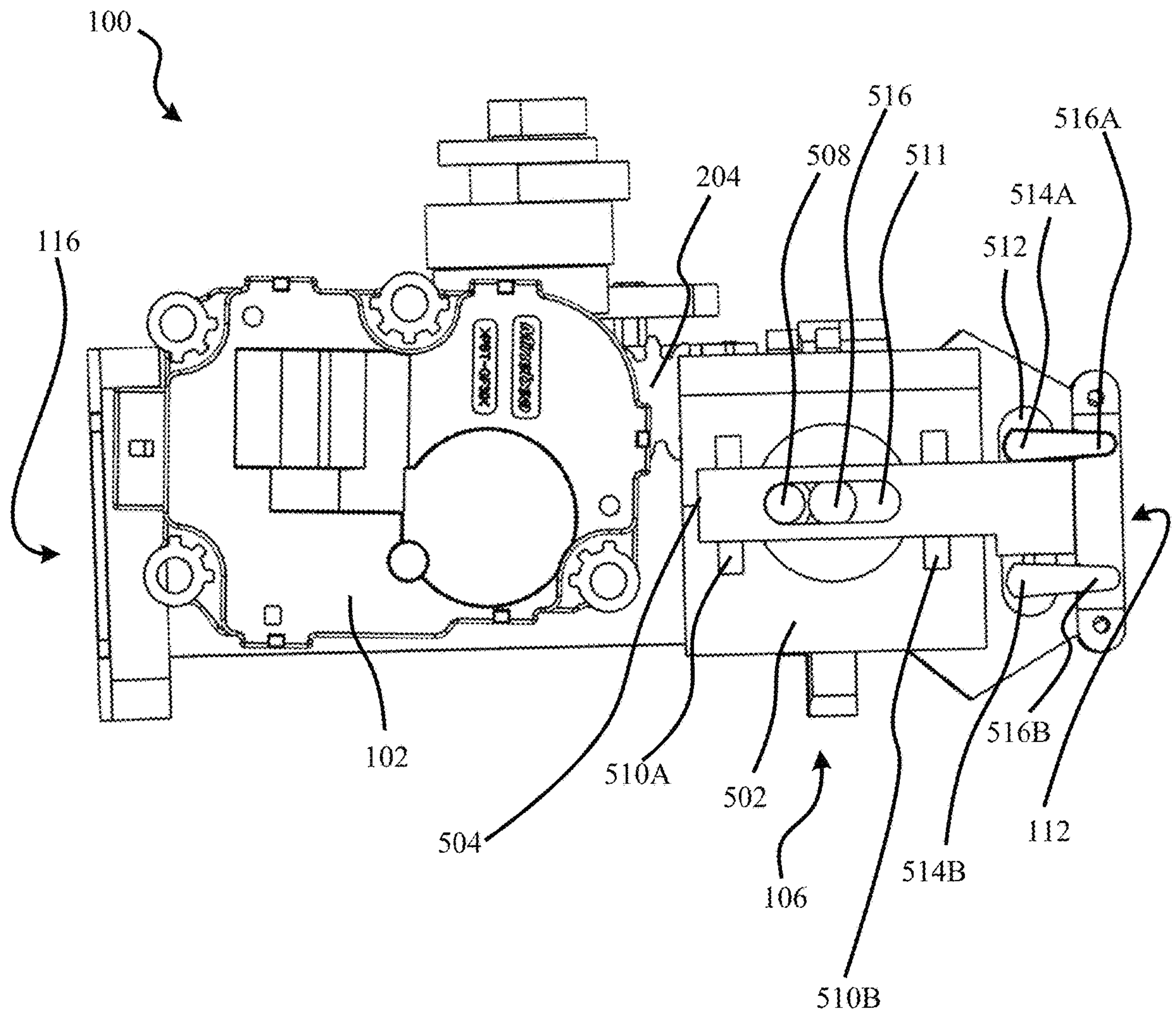
FIG. 5 is a right side view of the example vehicle air vent of FIG. 1

FIG. 5 illustrates a right side view of an example air vent 100 showing actuator 102 and primary vane drive system 106. Actuator can supply torque to primary vane drive system 106 through gear 202, which can mesh with gear 204. Gear 204 can mesh with the gear located on spindle 208 (illustrated by FIG. 3) and rotate spindle 208 about pin 506. Plate 502 can be rigidly mounted with respect to the other parts of air vent 100 (e.g., plate 502 will not move when the actuator is driving the vanes). Drive link 504 can be moved up and down relative to plate 502 by sliding along slots 510A, 510B. Drive link 504 can include protrusions, pins, etc. that slide within slots 510A, 510B. As spindle 208 rotates, pin 508, which can be eccentrically mounted on spindle 208 will rotate. Pin 508 will move along slot 511 and cause link 504 to move along longitudinally (along the vertical axis). Link 504 can be connected to primary vane guide bar 512, which can cause vertical movement of at least a portion of primary vanes 110. Primary vanes 110 may be pivotally mounted to body 104 at points 516A, 516B by links 514A, 514B.

Figure 6:
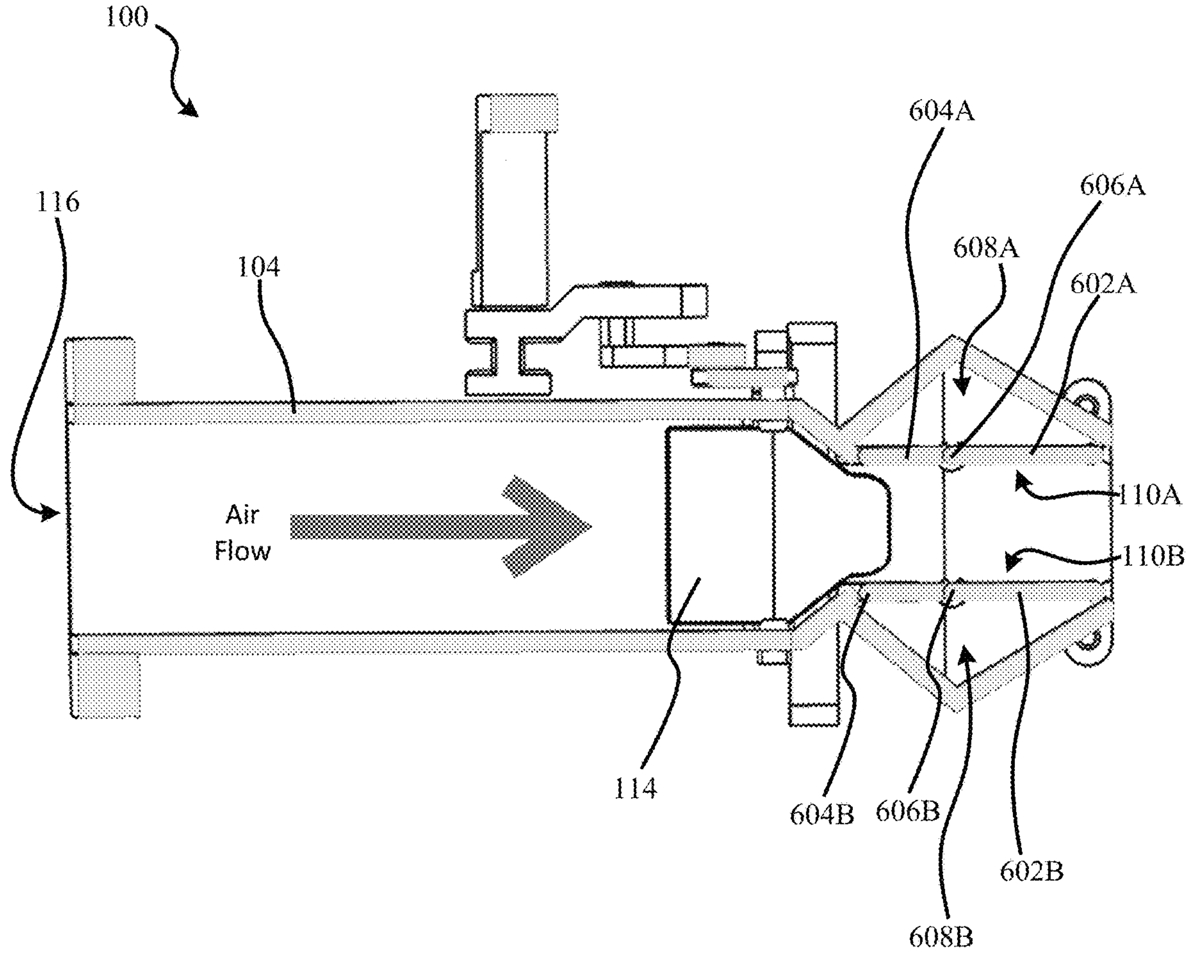
FIG. 6 is cross-sectional side view of the example vehicle air vent of FIG. 1.
Figure 7:
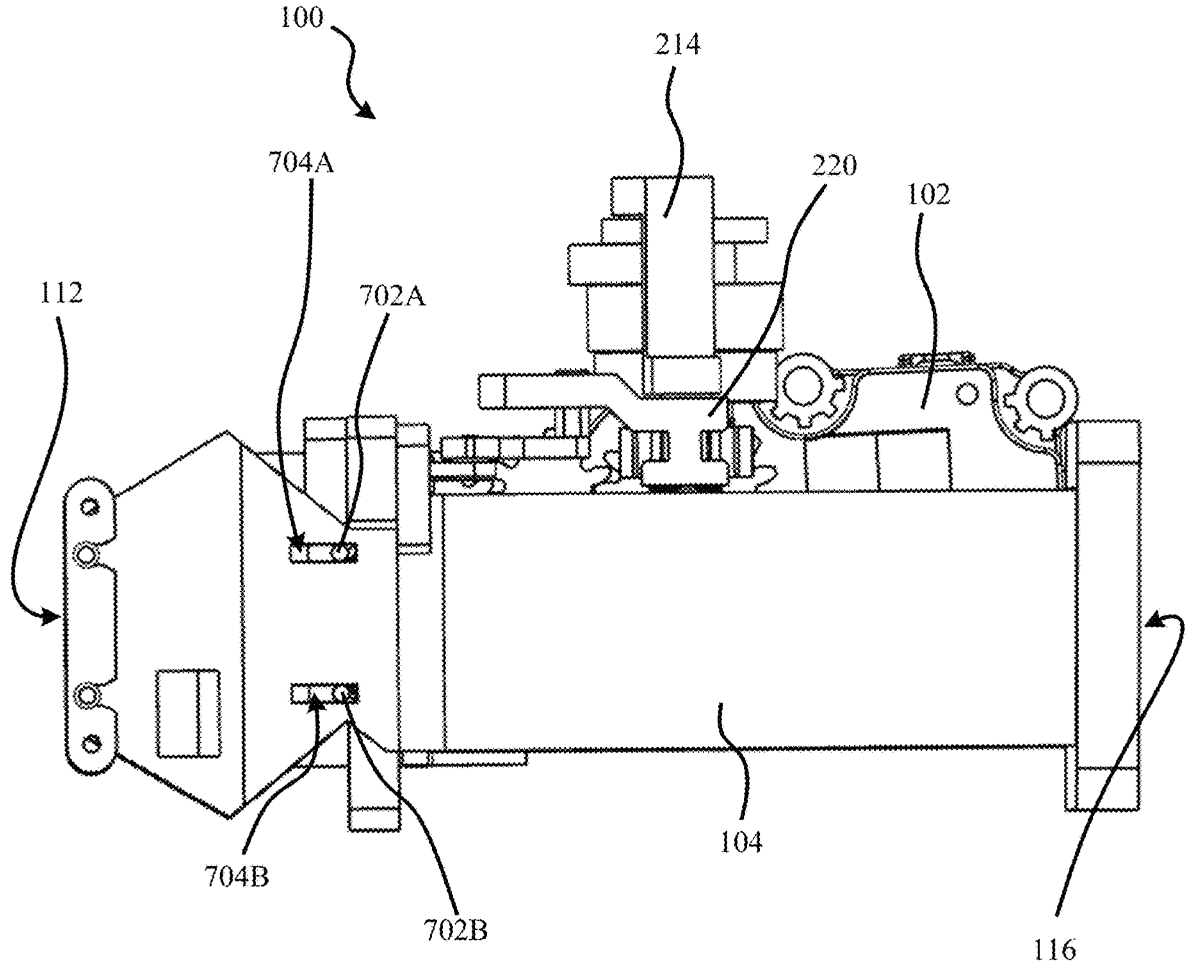
FIG. 7 is a left side view of the example vehicle air vent of FIG. 1.

FIG. 6 is a cross-sectional view of the side of air vent 100. As depicted primary vanes 110 may include two portions 602, 604 connected together at hinge 606. Hinges 606A, 606B can be connected to primary vane guide bar 512 and driven up and down to change the orientation of the vanes and thereby change the vertical direction of air flow through air vent 100. When primary vane guide bar is driven upwards, hinge 606A will move into void 608A and hinge 606B will rise into the cavity near outlet 112. This vane position will cause air through air vent 100 to be directed downward. Similarly, when primary vane guide bar 512 moves down, hinge 606B will move into void 608B and hinge 606A will drop into the cavity near outlet 112. This vane position will cause air through air vent 100 to be directed upward. As shown in FIG. 7, this vertical motion of hinges 606A, 606B is permitted by pivots 702 of primary vanes 110 sliding in slots 704 of body 104. Primary vanes 110 can be pivotally fixed to the front portion of body 104 near outlet 112. Alternatively, these positions may be reversed. For example, slots 704 could be located at the front of the body near outlet 112 and the fixed pivots could be located at the rear of primary vanes 110.

Figure 8:
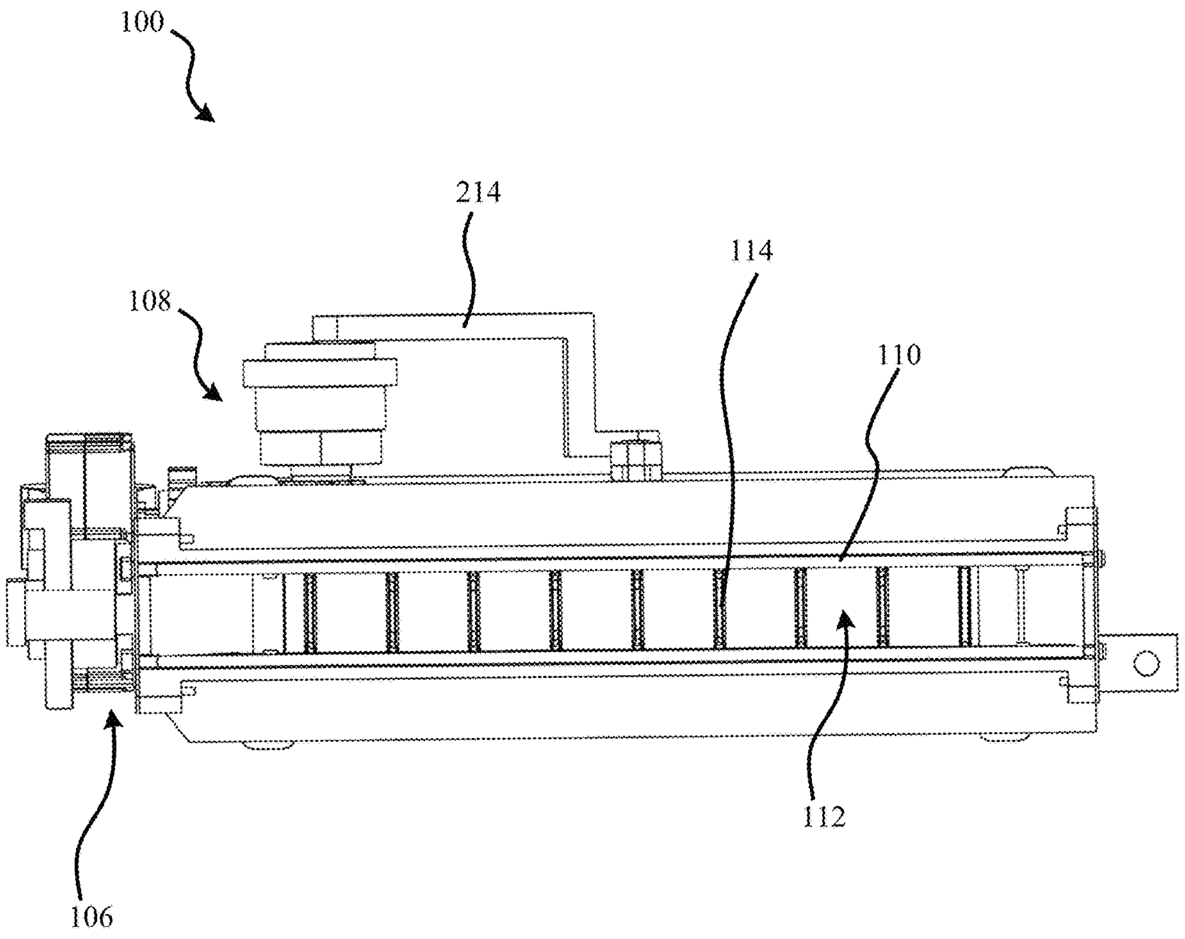
FIG. 8 is a front view of the example vehicle air vent of FIG. 1.
Figure 9:
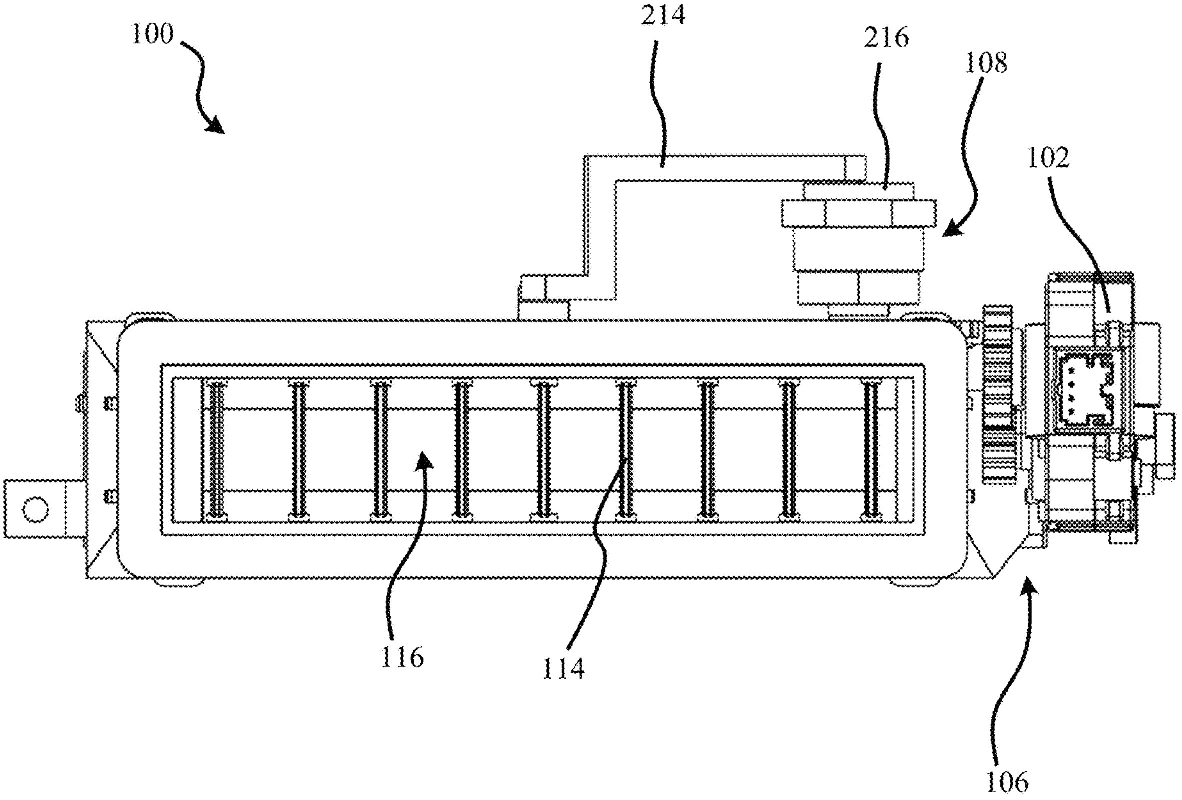
FIG. 9 is a back view of the example vehicle air vent of FIG. 1.

FIGS. 8 and 9 illustrate front and back views, respectively, of the air vent 100. In these figures, the primary vanes 110 and secondary vanes 114 are both in a neutral position, which would cause are to be directed straight out of outlet 112, parallel to the sides of body 104 of air vent 100.

Figure 10:
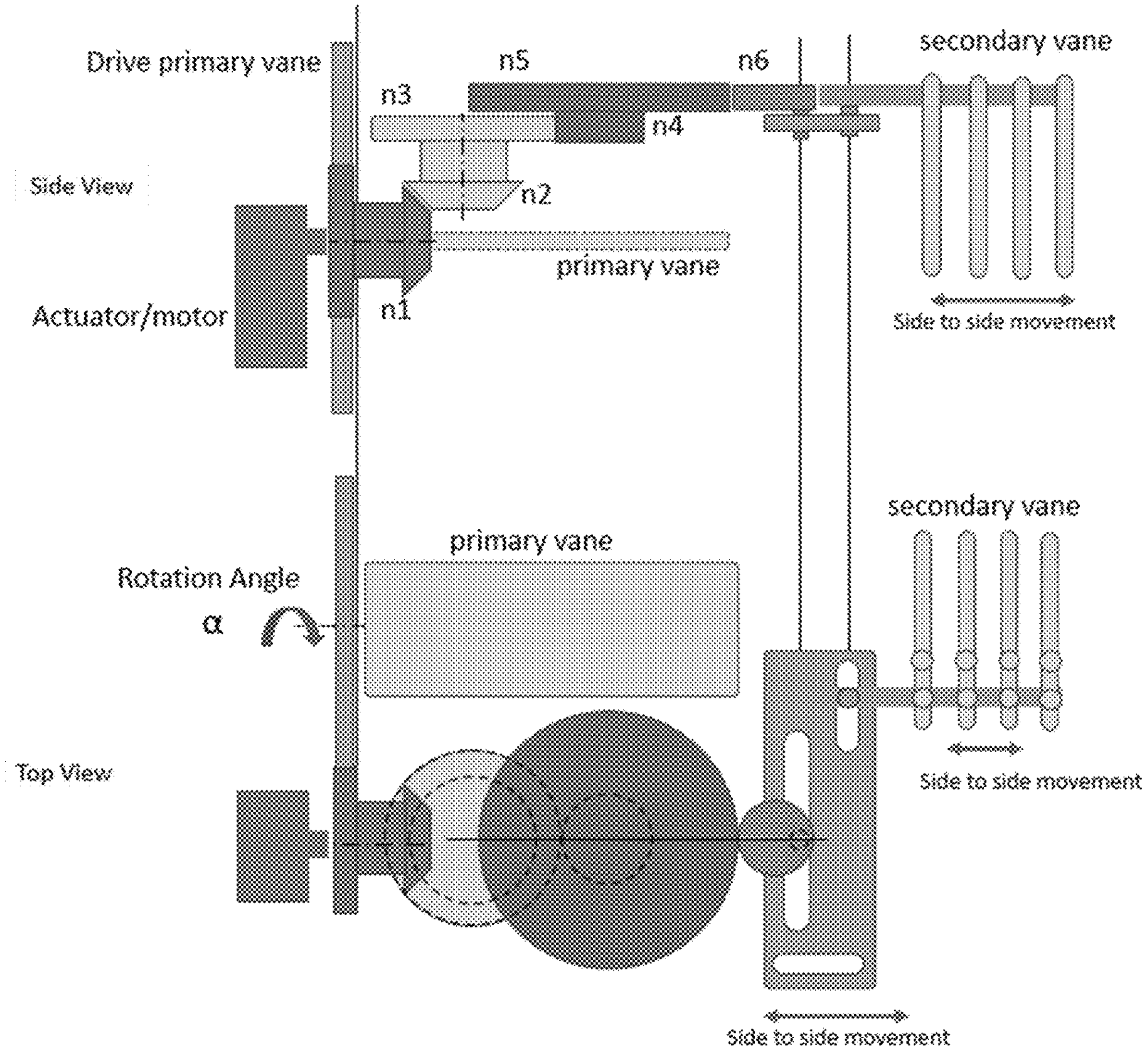
FIG. 10 is an illustration depicting schematic side view and top view of an example vehicle air vent blade drive system.

FIG. 10 provides a schematic view of a secondary vane drive system. As illustrated actuator can drive a bevel gear to turn other gears. The gears then are attached to a plate by an eccentric pin that cause translation of the plate. The plate is connected to each of the secondary vanes to translate one end of the secondary vanes and cause them to rotate about a fixed point. This rotation then permits selectable direction of airflow through the air vent. FIG. 10 includes indications n1-n6, which represent potentially different gear ratios between the various gears of the vane drive system.

For both secondary vane drive system 108 and primary vane drive system 106 described above, the figures illustrate a specific number of gears; however, more or fewer gears could be used in each system. Additionally, the sizes of the gears, number of teeth on each gear, and resulting gear ratios can vary from the gears depicted in the figures. The gear ratios of each drive system may be selected to achieve a specific relative speed difference between the drive of the primary vanes 110 and secondary vanes 114. In some cases, this may be achieved by adding additional gears or removing a gear from the drive systems. This speed difference will allow the single actuator 102 to drive in one direction, moving both the primary vanes 110 and secondary vanes 114 and still achieve a large variety of combinations of primary and secondary vane position to permit the user to direct the airflow in any direction (within the structural limitations of the vane rotation). The gears could be tuned to result in the secondary vanes 114 being moved at a substantially higher speed than the primary vanes 110. Conversely, the secondary vanes 114 could be moved a substantially slower speed than the primary vanes 110.

Figure 11A:
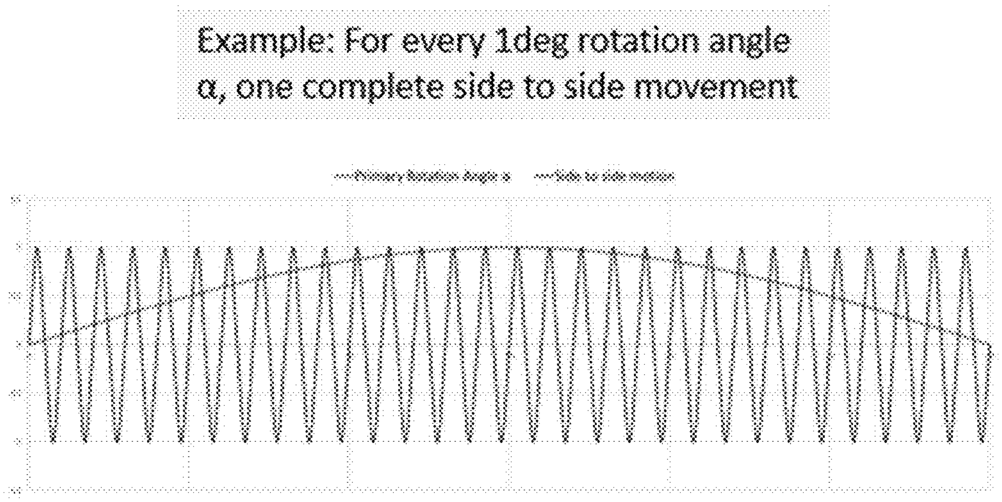
FIG. 11A is a graphical representation of an example of vehicle air vent vane movement.

As an example, the gears could be selected such that for every degree of rotation of the primary vanes 110, the secondary vanes 114 would travel one full revolution. In this context, a full revolution refers to a traversal of a vane through its full range of motion. In other words, in a full revolution, the secondary vanes 114 would travel from the maximum position on the right side to the maximum position on the left side. Thus, for each degree of the primary vane, the secondary vanes could be in any position within their range of motion. Therefore, the actuator 102 could be controlled to drive the secondary vanes to any position, and tune the primary vanes 110 to a specific angle within one degree. FIG. 11A is a graphical representation of such vane movement. In the specific example of FIG. 11A, the secondary vanes (side to side movement) are moved one full rotation for every one degree of primary vane movement (vertical vane set).

Figure 11B:
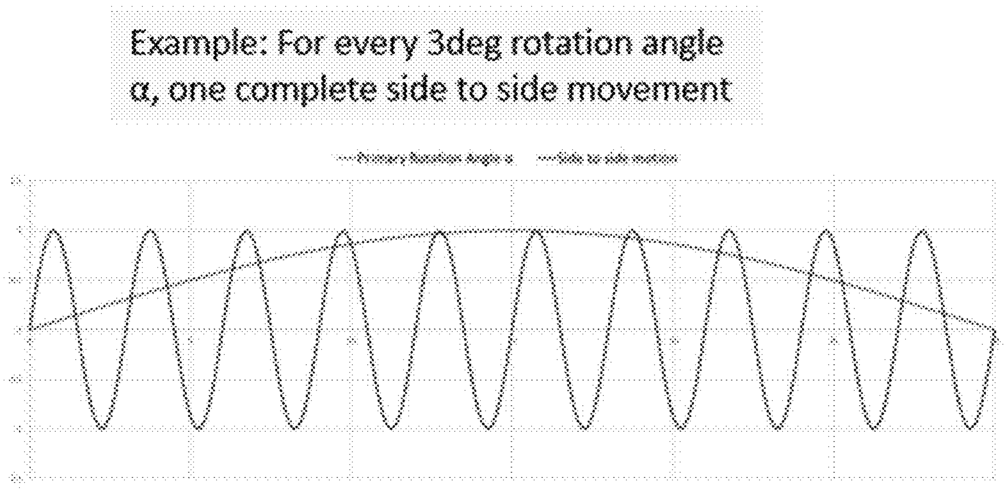
FIG. 11B is a graphical representation of a second example of vehicle air vent vane movement.

In other embodiments, the degree tolerance of the primary vanes 110 could change. For example, for less precise control over the primary vane 110 position, the secondary vanes 114 could travel one full revolution for every three or five degrees of primary vane 110 movement. FIG. 11B is a graphical representation of example vane movement of one full revolution of secondary vanes for every three degrees of movement of the primary vane (which in the example is the vertical vane set). As an example, for more precise control over primary vane 110 position, the secondary vanes 114 could travel one full revolution for every half degree of primary vane 110 movement. These relationships can be controlled by the relative gearing between the primary vane drive system 106 and the secondary vane drive system 108.

As a further example, the second vane drive system can be configured to drive the second set of vanes through a complete range of motion at least four times, eight times, twenty-five times, fifty times, or more for every one time that the first set of vanes is driven through a complete range of motion.

Implementing such a single actuator drive system permits fine automated control of vent blade position with limited programming and a reduction in the number of actuators required. This can reduce costs while also keeping the vent in a smaller form factor. The single actuator system presented here also permits a single uni-directional actuator to be used. Driving the actuator in a single direction can position both vanes at any position within their range of motion. This further facilitates simple programming (no need to program the system for multiple directions of rotation or multiple actuators) and allows cheaper single direction actuators to be used.

A further advantage of the single direction actuator system is that multiple sets of vanes can be set to any combination of angles in one stroke. For example, in some systems, the primary vane must be set to a specific angle first, then the secondary vane angle can be set next. For example, if the vanes start out in a position such that the primary vane is pointing for downward flow and the secondary vane is pointing for rightward flow and the user wants to set the vanes in the opposite direction (e.g., primary vanes pointing upward and secondary vanes pointing to the left), the actuator must first drive in one direction until the primary vane completes a cycle and reaches upward position. Then, the actuator can rotate in the opposite direction to achieve the desired angle for the secondary vanes.

In the present embodiments, the primary vanes can be driven in either direction based on the direction of the actuator. In other designs, the actuator may only drive the primary vane when it is rotation in one direction (and not the opposite direction). An analogy to such a system is the typical windshield wiper system. If you stop the wiper in the middle of the cycle, the next time you start it, it will have to complete the swing first before it returns to the starting position. Here, unlike such a system the primary vane angle can be driven directly to the desired position—the actuator can be driven in either direction, based on the previous position of the vane. An analogy to this system is the typical vehicle window system—a window that is rolled up halfway will continue to go up if the button is pushed up, and conversely will go down if the button is pushed down. This movement will happen directly (i.e., without going up first and then down next).

Figure 12:
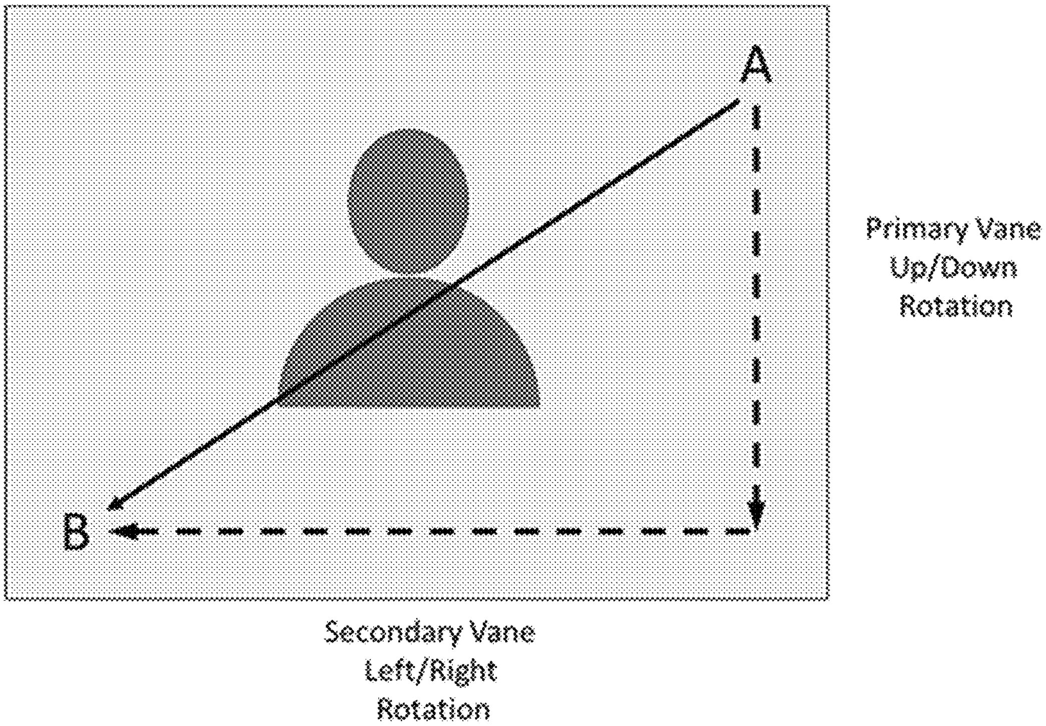
FIG. 12 is an illustration depicting movement of vanes in various vehicle air vent blade drive systems.

FIG. 12 is a graphical illustration of such systems. The outer rectangle represents the area of a human vehicle occupant around which air can be directed from a vent. Points A and B are two positions that form a state of the outlet vanes set at two different angles. For example, at Point A the primary vane guides the flow up, and secondary vane guides the flow to the right. In a system that drives the primary and secondary vanes separately, if the occupant wants to direct the flow to Point B, then the vanes follow the path illustrated by the dotted line path: the primary vane must come down using the first direction of rotation of the actuator and next the secondary vane kicks with the rotation of the actuator in opposite direction. This two step process takes additional time. Disclosed embodiments improve this process by being able to drive both vanes simultaneously to the desired position, thus reducing the time to achieve a desired vane position and thus air flow direction. This improvement is achieved by driving the vanes directly from Point A to Point B without the need to return to some starting position, as shown in the solid line connecting Point A to Point B.

Figure 13:
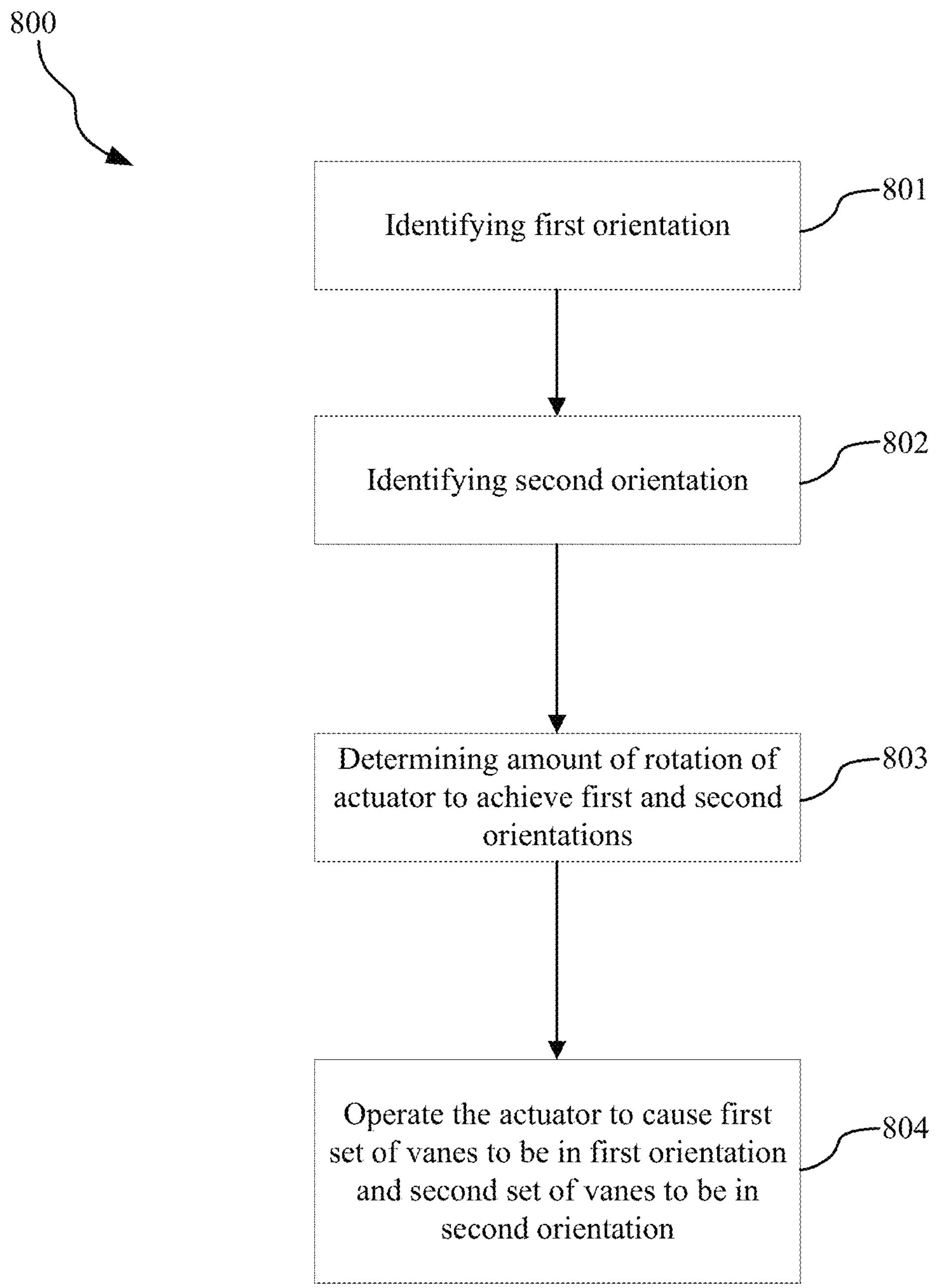
FIG. 13 is a flowchart illustrating a method of controlling a vehicle air vent.

FIG. 13 is a flowchart illustrating a method 800 of controlling a vehicle air vent, consistent with disclosed embodiments. Method 800 can be implemented to, for example, control primary and second vane sets of a vehicle air vent to drive the vanes in a position to cause air to be directed in a direction desired by a user. At step 801, method 800 can include identifying a first desired orientation for the first set of vanes. The first desired orientation can correspond to a first set of vanes of the vehicle air vent (e.g., vanes for directing vertical air flow) and a desired direction of air flow. At step 802, method 800 can include identifying a second desired orientation. Like the first desired orientation, the second desired orientation can correspond to a second set of vanes of the vehicle air vent (e.g., vanes for directing vertical air flow) and a desired direction of air flow. Identifying desired vane orientations can include receiving an input from a user corresponding to a desired orientation or desired path of air flow, from for example, an input device such as a touch screen, knob, lever, etc. The input device can be integrated into the dashboard of a vehicle. Identifying desired vane orientations can also include receiving desired orientations from another computing device.

Method 800 can be executed by a computing device, such as a computer within a vehicle. A "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include vehicle computers, personal computers, servers, mainframes, virtual machines, containers, gaming systems, televisions, and mobile electronic devices such as smartphones, personal digital assistants, cameras, tablet computers, laptop computers, media players, and the like. As a specific example, the vehicle computer could be the central computer of the vehicle or a computer associated with a touch screen of the vehicle. The computing device can be in communication with the input device. In some embodiments, the computing device and input device could be integral, such as a smartphone having a touch screen. The computing device may also be in communication with a controller that controls the function of the actuator (e.g., a motor controller).

At step 803, method 800 can include determining an amount of rotation of an actuator to achieve the first and second vane orientations. For example, step 803 may further include determining a current position or orientation for one or both of the vane sets. Then, based on the current position or positions and the desired orientations, an amount of rotation can be calculated. The amount of rotation can be dependent on, for example, the relative rotation rate between the first and second sets of vanes (e.g., one degree of the primary vane for every cycle of the secondary vanes, three degrees of the primary vane for every cycle of the secondary vanes, four full cycles of the secondary vane for every cycle of the primary vane, etc.). As described above, first and second vane drive systems (corresponding to first and second sets of vanes) can be configured to drive the first and second sets of vanes at different rates.

At step 804, method 800 can include operating the actuator to cause the first set of vanes to be positioned in the first desired orientation and the second set of vanes to be positioned in the second desired orientation. Specifically, the operating the actuator include causing the actuator (e.g., via a controller) to apply a torque to the first vane drive system. As described above, the first vane drive system includes at least one gear configured to transfer the torque from the actuator to the first set of vanes. As described above, a torque can also be applied to a second vane drive system, causing the second set of vanes to be driven at a different rate than the first. The torque to the second vane drive system can be applied directly by the actuator, or indirectly by the actuator (i.e., to a gear of the first vane drive system, which transfers the torque to a gear of the second vane drive system).

Other advantages of the present invention can be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described in this document, but is intended to include all changes and modifications that are within the scope and spirit of the invention as defined in the claims.

The invention claimed is:

1. A vehicle air vent comprising:
a body;
an actuator;
a first set of vanes;
a first vane drive system moveably connected to the first set of vanes;
a second set of vanes; and
a second vane drive system moveably connected to the second set of vanes; wherein
the actuator is positioned to, in operation, provide force to both the first and second vane drive systems in a single direction, thus causing movement of both the first and second sets of vanes,
the second vane drive system includes a spindle rotationally coupled to the actuator, a shaft eccentrically attached to the spindle such that rotation of the spindle causes (i) a first end of the shaft to rotate about a pin in which the spindle rotates and (ii) a second end of the shaft to translate forward/backward and left/right, and a vane guide bar attached to the second end of the shaft and the second set of vanes, and
the left/right translation of the second end of the shaft causes the second set of vanes to pivot and change direction of airflow through the body.

2. The vehicle air vent of claim 1, wherein the first vane drive system comprises at least one gear configured to transfer a torque from the actuator to the first set of vanes.

3. The vehicle air vent of claim 2, wherein the second vane drive system comprises a second gear configured to transfer a torque from the actuator to the second set of vanes.

4. The vehicle air vent of claim 1, wherein the second vane drive system is configured to drive the second set of vanes through a complete range of motion at least one time for about every one degree of movement of the first set of vanes.

5. The vehicle air vent of claim 1, wherein the second vane drive system is configured to drive the second set of vanes through a complete range of motion at least four times for every one time that the first set of vanes is driven through a complete range of motion.

6. The vehicle air vent of claim 1, wherein the second vane drive system is configured to drive the second set of vanes through a complete range of motion at least eight times for every one time that the first set of vanes is driven through a complete range of motion.

7. The vehicle air vent of claim 1, wherein the second vane drive system is configured to drive the second set of vanes through a complete range of motion at least twenty-five times for every one time that the first set of vanes is driven through a complete range of motion.

8. The vehicle air vent of claim 1, wherein the first and second vane drive systems are configured such that the force in a single direction drives the first set of vanes and the second set of vanes through a full range of motion without requiring a force in a second direction.

9. The vehicle air vent of claim 1, wherein the first set of vanes is positioned to direct air in a first direction.

10. The vehicle air vent of claim 9, wherein:
the second set of vanes is positioned to direct air in a second direction; and
the second direction is different from the first direction.

11. A method comprising:
in a system comprising a vehicle air vent having a first set of vanes and a second set of vanes:
operating, an actuator in a single direction causing the actuator to provide force to a first vane drive system corresponding to the first set of vanes and a second vane drive system corresponding to the second set of vanes, thus causing movement of both the first and second sets of vanes; wherein
the first and second vane drive systems are configured to drive the first and second sets of vanes at different rates,
the second vane drive system includes a spindle rotationally coupled to the actuator, a shaft eccentrically attached to the spindle such that rotation of the spindle causes (i) a first end of the shaft to rotate about a pin in which the spindle rotates and (ii) a second end of the shaft to translate forward/backward and left/right, and a vane guide bar attached to the second end of the shaft and the second set of vanes, and
the left/right translation of the second end of the shaft causes the second set of vanes to pivot and change direction of airflow through the body.

12. The method of claim 11, wherein the operating causes the actuator to apply a torque to the first vane drive system.

13. The method of claim 12, wherein the first vane drive system comprises at least one gear configured to transfer the torque from the actuator to the first set of vanes.

14. The method of claim 12, further comprising:
identifying a first desired orientation for the first set of vanes;
identifying a second desired orientation for the second set of vanes; and
operating the actuator to cause the first set of vanes to be positioned in the first desired orientation and the second set of vanes to be positioned in the second desired orientation.

15. A vehicle air vent comprising:
a body;
an actuator;
a first set of vanes;
a first vane drive system moveably connected to the first set of vanes and comprising a first gear;
a second set of vanes; and
a second vane drive system moveably connected to the second set of vanes and comprising a second gear; wherein
the actuator is positioned to, in operation, provide force to the first and second gears in a single direction, thus causing movement of both the first and second sets of vanes; and
the second vane drive system is configured to drive the second set of vanes through a complete range of motion at least four times for every one time that the first set of vanes is driven through a complete range of motion,
the second vane drive system includes a spindle rotationally coupled to the actuator, a shaft eccentrically attached to the spindle such that rotation of the spindle causes (i) a first end of the shaft to rotate about a pin in which the spindle rotates and (ii) a second end of the shaft to translate forward/backward and left/right, and a vane guide bar attached to the second end of the shaft and the second set of vanes, and
the left/right translation of the second end of the shaft causes the second set of vanes to pivot and change direction of airflow through the body.

16. The vehicle air vent of claim 15, wherein the first set of vanes is positioned to direct air in a first direction.

17. The vehicle air vent of claim 16, wherein:
the second set of vanes is positioned to direct air in a second direction; and
the second direction is different from the first direction.

18. The vehicle air vent of claim 15, wherein the actuator is positioned to apply the force directly to both the first gear and second gear.

19. The vehicle air vent of claim 15, wherein:

the actuator is positioned to apply the force directly to the first gear; and the first gear is positioned to transfer the force to the second gear.

20. The vehicle air vent of claim 15, wherein the actuator comprises a motor that rotates in a single direction, and the force is a torque.

* * * * *